United States Patent
Dahlstedt et al.

(10) Patent No.: US 7,080,374 B2
(45) Date of Patent: Jul. 18, 2006

(54) SYSTEM AND METHOD FOR USING NATIVE CODE INTERPRETATION TO MOVE THREADS TO A SAFE STATE IN A RUN-TIME ENVIRONMENT

(75) Inventors: Joakim Dahlstedt, Stockholm (SE); Peter Lonnebring, Stockholm (SE)

(73) Assignee: BEA Systems, Inc., San Jose, CA (US)

( * ) Notice: Subject to any disclaimer, the term of this patent is extended or adjusted under 35 U.S.C. 154(b) by 88 days.

(21) Appl. No.: 10/737,326

(22) Filed: Dec. 16, 2003

(65) Prior Publication Data

US 2004/0133891 A1  Jul. 8, 2004

Related U.S. Application Data

(60) Provisional application No. 60/434,785, filed on Dec. 18, 2002.

(51) Int. Cl.
*G06F 9/45* (2006.01)
(52) U.S. Cl. .......................... 718/1; 717/139
(58) Field of Classification Search ........ 719/310–332; 718/100–108; 717/100–178
See application file for complete search history.

(56) References Cited

U.S. PATENT DOCUMENTS

| | | | |
|---|---|---|---|
| 6,192,391 B1 * | 2/2001 | Ohtani | 709/201 |
| 6,523,059 B1 * | 2/2003 | Schmidt | 718/100 |
| 6,560,626 B1 * | 5/2003 | Hogle et al. | 718/102 |
| 6,711,739 B1 * | 3/2004 | Kutcher | 718/1 |
| 6,910,209 B1 * | 6/2005 | Kawahara et al. | 718/102 |
| 2002/0161816 A1 * | 10/2002 | Kawahara et al. | 709/103 |

FOREIGN PATENT DOCUMENTS

JP   07219789 A  *  8/1995

OTHER PUBLICATIONS

IBM Research Disclosure. "A Method for Suspending Threads at Safe Points." Mar. 1, 1999.*
INT Business Machines Corp. "Suspending threads at safe points—involves suspending thread until handler is called for thread execution." Feb. 20, 1999.*
Luo, Jiangchun et al. "Safe Termination of Java Classes." Nov. 24, 1999.*
Rudys, Algis et al. "Termination in Language-based Systems." Network and Distributed Systems Security Symposium 2001. Feb. 2001.*

* cited by examiner

*Primary Examiner*—Lewis A. Bullock, Jr.
(74) *Attorney, Agent, or Firm*—Fliesler Meyer, LLP

(57) ABSTRACT

A system and a method for interpreting native code to move threads to a safe state in a run-time environment. In a runtime system or virtual machine (VM) environment, threads process requests to the VM. In many instances such as garbage collection, context switching, and single CPU locking, the threads must be stopped in a safe state for the operation to successfully complete. The invention can be used to ensure that a thread is stopped in such a safe state. In accordance with an embodiment of the invention, when a first thread A is stopped by a second thread B, if A is not in a safe state the invention allows thread B to roll thread A forward to a safe state by interpreting the machine instruction currently is at A. A's state is then updated accordingly.

60 Claims, 4 Drawing Sheets

SYSTEM AND METHOD FOR USING NATIVE CODE INTERPRETATION TO MOVE THREADS TO A SAFE STATE IN A RUN-TIME ENVIRONMENT

CLAIM OF PRIORITY

This application claims the benefit of U.S. Provisional Application "SYSTEM AND METHOD FOR USING NATIVE CODE INTERPRETATION TO MOVE THREADS TO A SAFE STATE IN A RUN-TIME ENVIRONMENT", Ser. No. 60/434,785; filed Dec. 18, 2002, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to run-time and virtual machine environments, and particularly to a system and method for moving threads to a safe state within the run-time environment using native code interpretation.

BACKGROUND OF THE INVENTION

As described herein, a run-time environment is typically one in which an application server or virtual machine executes on a computer processing device, computer, or machine. Examples of such run-time environments include Sun's Java Virtual Machine from Sun Microsystems, Inc. and the JRockit Virtual Machine from Bea Systems, Inc. Typically the run-time environment, often referred to as a virtual machine (VM) executes upon an application server operating system, and provides access to a plurality of clients such as Java clients, that wish to run applications at the server. The system is generally thread-based in that requests for processing at the server execute in threads and are handled by the server within these threads. However, problems may arise if the threads are stopped in an unstable (or more correctly termed "unsafe") state. The term "run-time system" may suggest that threads are continuously running or executing. However, there are many instances, some of which are described in further detail below, in which the threads must be stopped in order to perform some particular operation. When the threads are stopped in this manner problems may arise unless the threads are stopped in a safe state.

Among the circumstances that require the threads to be stopped in order to perform operations, the following are perhaps of most importance.

1. Garbage collection. Most run-time environments, including the Java Virtual Machine and the JRockit Virtual Machine support some form of garbage collection. This is a process in which objects that are no longer in use by the run-time environment are deleted or cleared, to free up resources for use by other objects. A typical garbage collection process requires each thread to report which objects associated with that thread are still in use or "alive". The usual approach to this is to create a "live map" or a garbage collection map for each thread which identifies the live objects. However, in order to create the live map or garbage collection map the thread must be stopped in a safe state, and preferably on an instruction that contains a live object.

2. Context switching. Depending on the run-time environment or the virtual machine being used, context switching may be performed within the threads. Preemptive switching from one thread to another is not always allowed, and depending on the run-time environment may not be recommended. In any case context switching is only allowed on a safe state instruction. This requires the threads to be stopped in a safe state prior to context switching. Some vendors have tried to work around this problem by incorporating a state flag within each thread. For example, operating systems such as Solaris and Linux use a state flag to indicate whether the thread is in a non-switchable state. If the state flag indicates the thread is in a non-switchable state the system resumes thread execution and retries again at a later point in time.

3. Thread locking on a single CPU machine. This factor is an extension of the context switching feature described above. When using a single processor machine (i.e., using a single thread to run all of the code), care must be taken to ensure that preemptive thread switching is not performed within lock regions.

The traditional approach to the problem of stopping the threads in a safe states is to select one of three strategies. First, the system can attempt to make all states safe prior to stopping them. This is not always possible depending on the specific situation. This approach is also very costly memory-wise to implement.

An alternative approach is to poll the threads, i.e., to stop, then restart the thread, and stop it again a little later in time, until it is eventually stopped in a safe state. The problem with this approach is that it is cumbersome and involves numerous thread context switching. Furthermore, the polling approach is not even guaranteed to terminate since it starts and stops threads randomly and will only complete if it stops in a safe state, which potentially may never happen (although will typically just take a long time to happen).

The third approach is to determine if a thread is stopped in an unsafe state, and if it is determined as such then the system inserts a stop-point at a safe-state point, restarts the thread, and lets it run until it reaches the stop-point. This code patching approach is also very cumbersome and time-consuming to use, and requires numerous thread context switches.

SUMMARY OF THE INVENTION

As described herein the present invention provides a system and a method for interpreting native code to move threads to a safe state in a run-time environment and which overcomes many of the problems associated with traditional approaches, including thread polling, and code patching. In a run-time or virtual machine environment, threads are used to process requests to the virtual machine (VM). In many instances such as garbage collection, context switching, and single CPU locking, the threads must be stopped in a safe state in order for the operation to successfully complete. The invention can be used to ensure that a thread is stopped in such a safe state. In accordance with an embodiment of the invention, when a first thread A is stopped by a second thread B, if A is not in a safe state the invention allows thread B to roll thread A forward to a safe state by interpreting the machine instruction currently at A. A's state is then updated accordingly. When the system is satisfied that A is standing at a safe state instruction, the machine instruction interpretation can stop.

DETAILED DESCRIPTION

The present invention provides a system and a method for interpreting native code to move threads to a safe state in a run-time environment. In a run-time or virtual machine environment, threads are used to process requests to the virtual machine (VM). In many instances such as garbage collection, context switching, and single CPU locking, the threads must be stopped in a safe state in order for the operation to successfully complete. The invention can be used to ensure that a thread is stopped in such a safe state. In accordance with an embodiment of the invention, when a first thread A is stopped by a second thread B, if A is not in a safe state the invention allows thread B to roll thread A forward to a safe state by interpreting the machine instruction currently at A. A's state is then updated accordingly. When the system is satisfied that A is standing at a safe state instruction, the machine instruction interpretation can stop. The system can be used with multiple threads, and can be implemented to solve many types of problems in addition to context switching and garbage collection.

Figure 1:
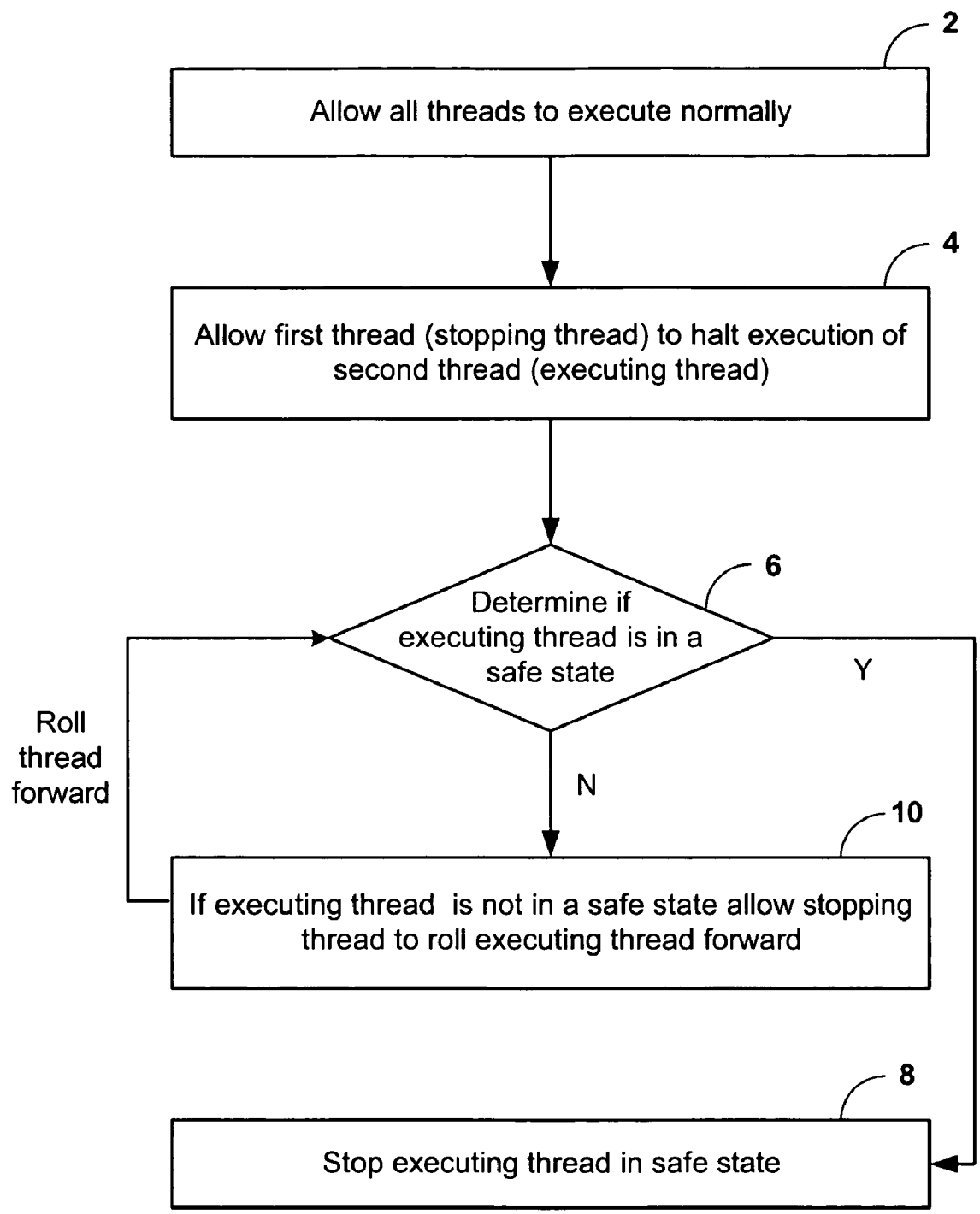
FIG. 1 shows a flowchart of a process in accordance with an embodiment of the invention that allows a first thread to halt execution of a second thread such that the second thread is stopped in a safe state.

FIG. 1 shows a flowchart of a method in accordance with an embodiment of the invention in which a first thread is allowed to stop a second thread such that the second thread is in a safe state. Stopping threads in this manner allows certain operations such as garbage collection, context switching and thread locking to take place, which would otherwise not be possible. As shown in FIG. 1, in step 2 the system allows the threads to execute normally. This is the typical situation in a virtual machine environment. In step 4, when the threads need to be stopped, for example, for purposes of garbage collection, a first thread (the stopping thread) is allowed to halt the execution of a second thread (the executing thread) within the virtual machine. In step 6, the system then determines if the executing thread is in a safe state. If the system determines that the executing thread is currently in a safe state then it is stopped, as indicated by step 8. However, if the system determines in step 10 that the executing thread is not currently in a safe state, then the stopping thread is allowed to roll forward the executing thread until it is finally determined to be in a safe state. In practice, this roll forward is performed in a series of iterations, including at each point in step 6 determining if the executing thread is currently in a safe state. When, in step 6, the system eventually decides that the executing thread is now in a safe state, the process ends.

Figure 2:
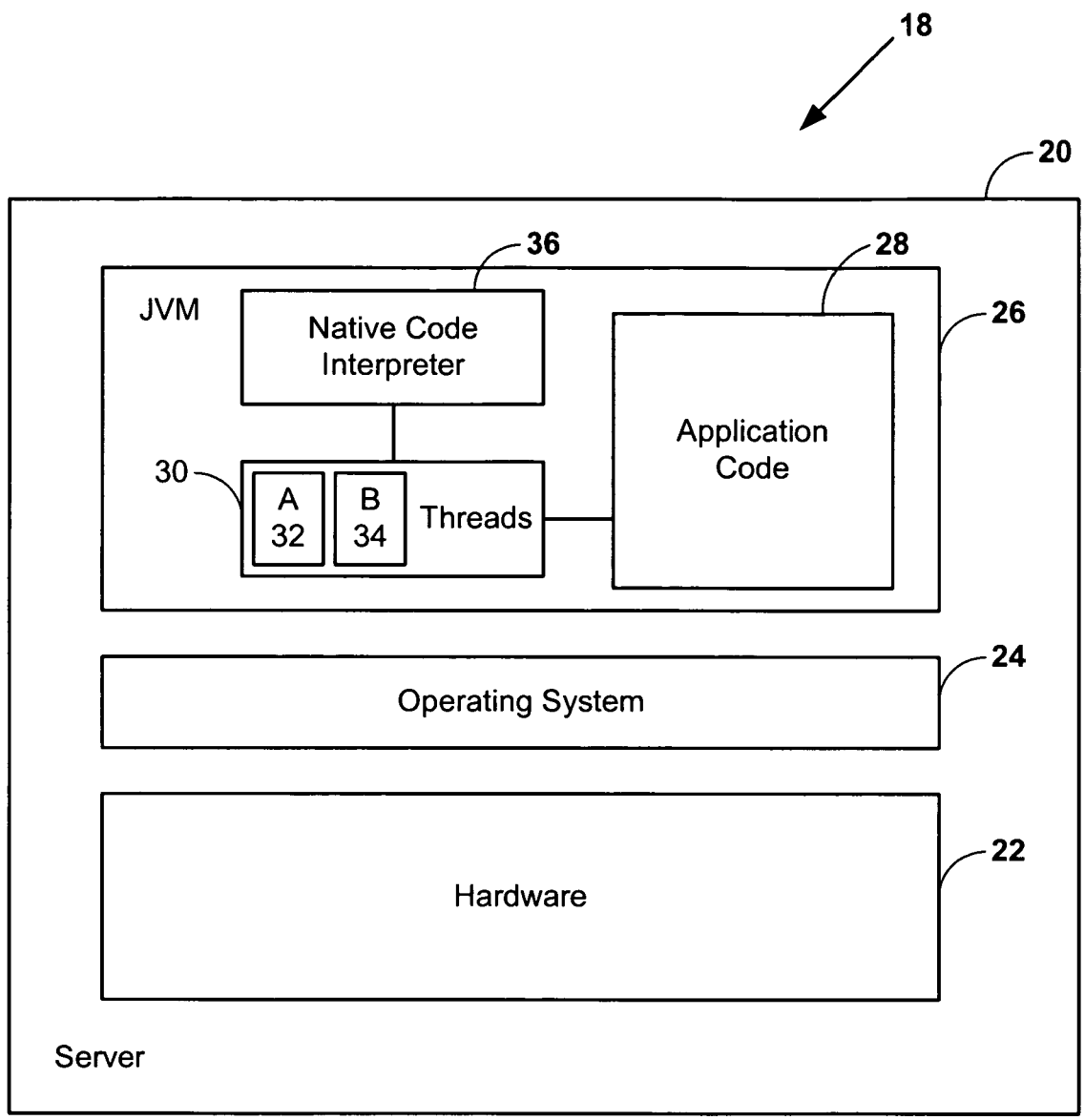
FIG. 2 shows a schematic of a system in accordance with an embodiment of the invention that uses a native code interpreter within a VM to perform thread stopping such that the threads are stopped in a safe state.

FIG. 2 illustrates a schematic of a typical system in accordance with an embodiment of the invention that uses or incorporates the current invention. As shown in FIG. 2, the system 18 includes a server 20 which comprises a physical computer, computing device or a machine, or a server process running on a computer. The server will typically include hardware 22 and operating system 24 components, in addition to a virtual machine or run-time environment 26. As used in this embodiment of the invention the run-time environment includes application code 28 which executes as a number of threads 30, including a first thread A 32 and a second thread B 34. As used in this embodiment of the invention, the system also includes a native code interpreter 36 which the system uses to allow a thread to roll forward another thread to a safe state by interpreting the native code and the state at which the currently executing thread exists.

Figure 3:
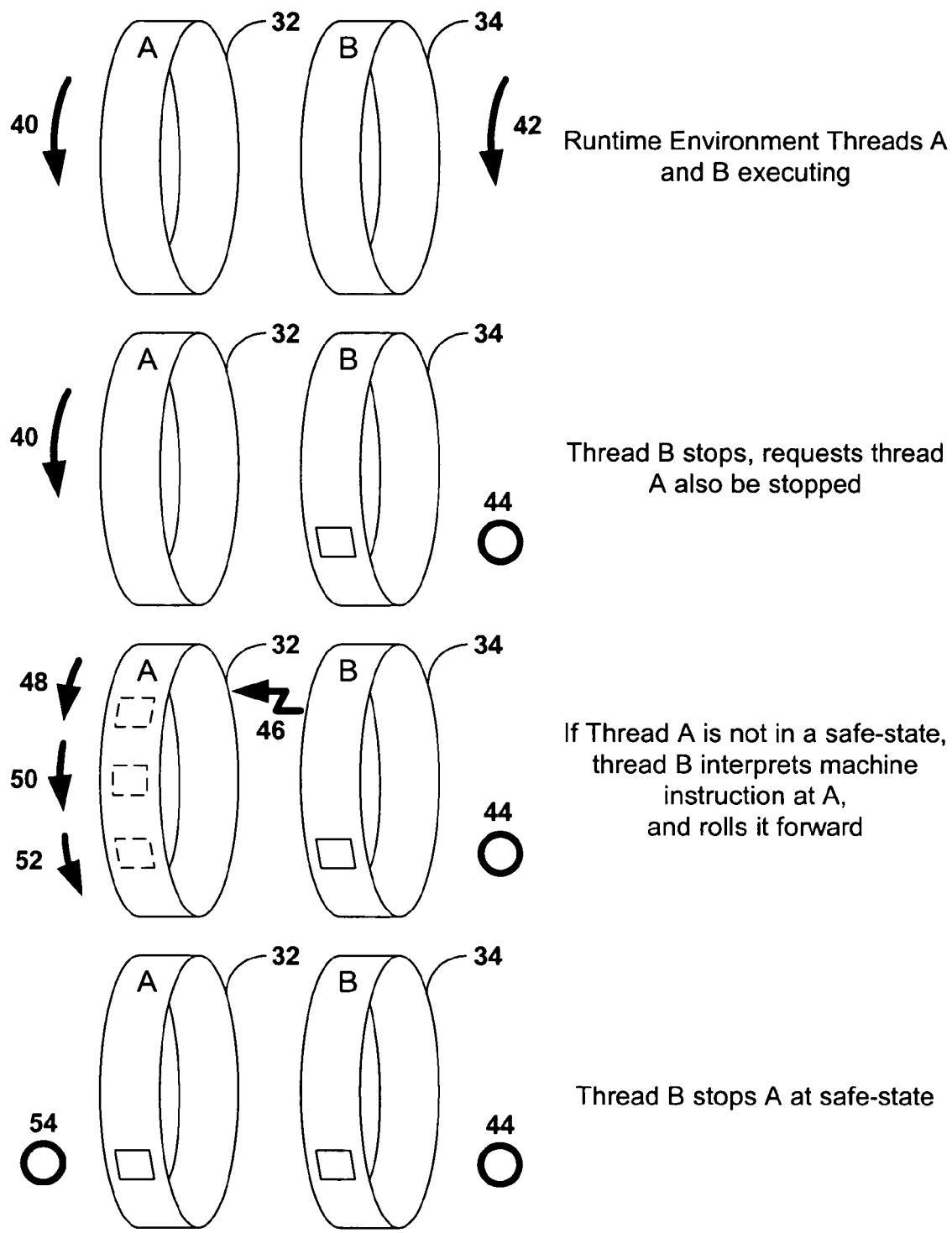
FIG. 3 illustrates a schematic of an embodiment of the invention that illustrates how a first thread A can be stopped and then rolled forward by a second thread B such that thread A is stopped in a safe state.

FIG. 3 illustrates a schematic in accordance with an embodiment of the invention showing how a thread may stop execution, and subsequently roll forward the executing thread so that executing thread is stopped in a safe state. As shown in FIG. 3, the typical situation with the run-time environment is to have threads A 32 and threads B 34 currently executing (indicated by the arrows 40 and 42 respectively). At any given point in time, for example when garbage collection is initiated or when the system wishes to perform context switching within the threads, one of the threads, in this instance thread B, is stopped (indicated by circle 44). In accordance with an embodiment of the invention, thread B could also request that thread A be stopped. When thread A is first stopped, the system determines if thread A is currently in a safe state. If its not in a safe state then thread B is allowed to roll forward thread A using a machine code interpretation 46 of thread A's current state. Thread A is subsequently rolled forward in discrete steps (indicated by arrows 48, 50, and 52 respectively), until thread A is found to be in a safe state. When both threads A and B are stopped at a safe state (indicated by circles 44 and 54) the process ends.

Figure 4:
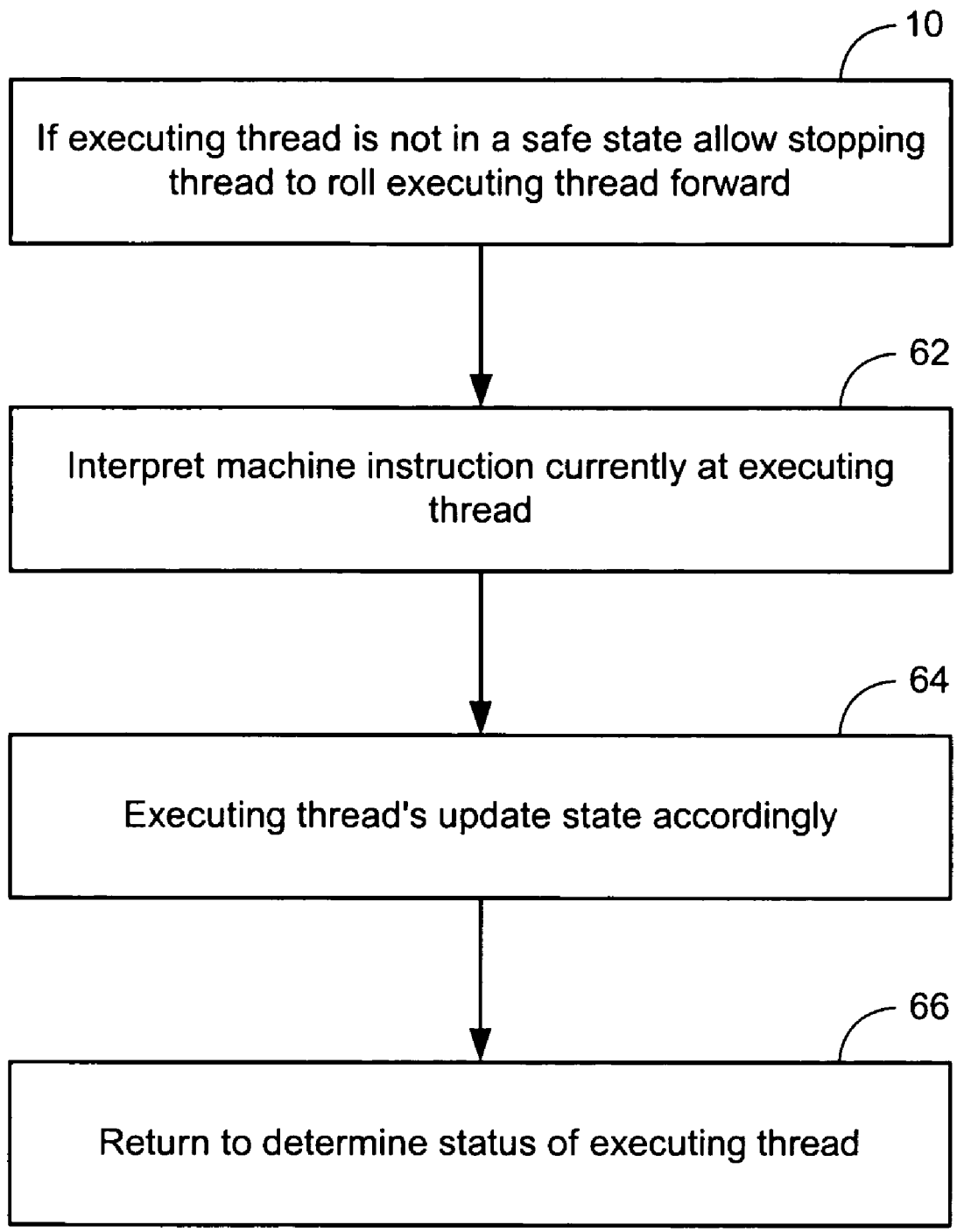
FIG. 4 illustrates a flowchart in accordance with an embodiment of the invention that illustrates how a thread uses machine instruction interpretation to roll another thread forward to a safe state.

FIG. 4 illustrates a flowchart in accordance with an embodiment of the invention that allows an executing thread to be stopped by another thread and then rolled forward using machine instruction interpretation so that the thread is stopped in a safe state.

In step 10, which corresponds to step 10 in FIG. 1), the system determines that if the executing thread is not currently in a safe state it should allow a stopping thread to roll the executing thread forward to a safe state. In step 62 the system interprets the machine instruction currently at A. In step 64 A's state is then updated in response to interpreting the machine code instruction. In step 66, control is then returned to the main process to determine whether the executing thread is now in a safe state and thus can be safely stopped.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system and methods described above are described in the context of a WebLogic server, and a JRockit virtual machine, it will be evident that the system and methods may be used with other types of application servers, runtime systems, and virtual machines, including other types of JVMs. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system run on one or more processors for stopping threads in a safe state in a run-time environment comprising:
   a plurality of application threads; and,
   a native code interpreter which is configured to stop execution of an executing thread such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

2. The system of claim 1 wherein the system includes a virtual machine and wherein said plurality of application threads execute as part of said virtual machine.

3. The system of claim 1 wherein the system is used for the garbage collection of inactive threads in the run-time environment.

4. The system of claim 1 wherein the system is used to perform context-switching between the threads in a run-time environment.

5. The system of claim 1 wherein the native code interpreter is configured to interpret the machine code currently at the executing second thread, and provide interpreted machine code information to the system for use in stopping the executing second thread in a safe state.

6. A system run on one or more processors for moving threads to a safe state in a run-time environment comprising:
   a plurality of application threads; and,
   a native code interpreter which is used to allow a first or a stopping thread to roll a second or an executing thread forward such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

7. The system of claim 6 wherein the system includes a virtual machine and wherein said stopping and executing threads execute as part of said virtual machine.

8. The system of claim 6 wherein the system is used for the garbage collection of inactive threads in the run-time environment.

9. The system of claim 6 wherein the system is used to perform context-switching between the threads in a run-time environment.

10. The system of claim 6 wherein the native code interpreter is configured to interpret the machine code currently at the executing second thread, and provide interpreted machine code information to the system for use in stopping the executing second thread in a safe state.

11. A system run on one or more processors which uses native code interpretation to move threads to a safe state in a run-time environment comprising:
    a first and second application threads; and,
    a native code interpreter configured to allow the first thread to stop execution of the second thread and roll the second thread forward such that the second thread is stopped, and the native code interpreter interprets machine code to determine if the second thread is in a safe state, and wherein if the second thread is not in a safe state, the native code interpreter moves the second thread forward in steps and at each step determines the state until the second thread is finally stopped in a safe state.

12. The system of claim 11 wherein the system includes a virtual machine and wherein said first and second application threads execute as part of said virtual machine.

13. The system of claim 11 wherein the system is used for the garbage collection of inactive threads in the run-time environment.

14. The system of claim 11 wherein the system is used to perform context-switching between the threads in a run-time environment.

15. The system of claim 11 wherein the native code interpreter is configured to interpret the machine code currently at the executing second thread, and provide interpreted machine code information to the system for use in stopping the executing second thread in a safe state.

16. A system run on one or more processors which uses native code interpretation to stop threads in a safe state in a run-time environment, including instructions stored thereon which when executed cause the system to perform the steps of:
    allowing a first thread to initially halt execution of a second thread;
    using native code interpretation of machine code to determine the current state of the second thread; and,
    allowing the first thread to roll forward the state of the second thread, wherein if the second thread is not in a safe state, the first thread uses a native code interpreter to move the second thread forward in steps and each step to determine the state until the second thread is finally stopped in a safe state.

17. The system of claim 16 wherein the system includes a virtual machine and wherein said plurality of first and second threads execute as part of said virtual machine.

18. The system of claim 16 wherein the system is used for the garbage collection of inactive threads in the run-time environment.

19. The system of claim 16 wherein the system is used to perform context-switching between the Threads in a run-time environment.

20. The system of claim 16 wherein the native code interpretation is performed by interpreting the machine code currently at the executing second thread, and providing interpreted machine code information to the system for use in stopping the executing second thread in a safe state.

21. A method run on one or more processors for stopping threads in a safe state in a run-time environment, comprising the steps of:
providing a plurality of application threads; and,
providing a native code interpreter which is configured to stop execution of an executing thread such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

22. The method of claim 21 wherein the system includes a virtual machine and wherein said plurality of application threads execute as part of said virtual machine.

23. The method of claim 21 wherein the system is used for the garbage collection of inactive threads in the run-time environment.

24. The method of claim 21 wherein the system is used to perform context-switching between the threads in a run-time environment.

25. The method of claim 21 wherein the native code interpreter is configured to interpret the machine code currently at the executing second thread, and provide interpreted machine code information to the system for use in stopping the executing second thread in a safe state.

26. A method run on one or more processors for moving threads to a safe state in a run-time environment, comprising the steps of:
providing a plurality of application threads; and,
providing a native code interpreter which is used to allow a first or a stopping thread to roll a second or an executing thread forward such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

27. The method of claim 26 wherein the system includes a virtual machine and wherein said stopping and executing threads execute as part of said virtual machine.

28. The method of claim 26 wherein the system is used for the garbage collection of inactive threads in the run-time environment.

29. The method of claim 26 wherein the system is used to perform context-switching between the threads in a run-time environment.

30. The method of claim 26 wherein the native code interpreter is configured to interpret the machine code currently at the executing second thread, and provide interpreted machine code information to the system for use in stopping the executing second thread in a safe state.

31. A method run on one or more processors which uses native code interpretation to move threads to a safe state in a run-time environment, comprising the steps of:
providing a first and second application threads; and,
providing a native code interpreter configured to allow the first thread to stop execution of the second thread and roll the second thread forward such that the second thread is stopped, and the native code interpreter interprets machine code to determine if the second thread is in a safe state, and wherein if the second thread is not in a safe state, the native code interpreter moves the second thread forward in steps and at each step determines the state until the second thread is finally stopped in a safe state.

32. The method of claim 31 wherein the system includes a virtual machine and wherein said first and second application threads execute as part of said virtual machine.

33. The method of claim 31 wherein the system is used for the garbage collection of inactive threads in the run-time environment.

34. The method of claim 31 wherein the system is used to perform context-switching between the threads in a run-time environment.

35. The method of claim 31 wherein the native code interpreter is configured to interpret the machine code currently at the executing second thread, and provide interpreted machine code information to the system for use in stopping the executing second thread in a safe state.

36. A method run on one or more processors which uses native code interpretation to stop threads in a safe state in a run-time environment, comprising the steps of:
allowing a first thread to initially halt execution of a second thread;
using native code interpretation of machine code to determine the current state of the second thread; and,
allowing the first thread to roll forward the state of the second thread, wherein if the second thread is not in a safe state, the first thread uses a native code interpreter to move the second thread forward in steps and at each step to determine the state until the second thread is finally stopped in a safe state.

37. The method of claim 36 wherein the system includes a virtual machine and wherein said plurality of first and second threads execute as part of said virtual machine.

38. The method of claim 36 wherein the system is used for the garbage collection of inactive threads in the run-time environment.

39. The method of claim 36 wherein the system is used to perform context-switching between the threads in a run-time environment.

40. The method of claim 36 wherein the native code interpretation is performed by interpreting the machine code currently at the executing second thread, and providing interpreted machine code information to the system for use in stopping the executing second thread in a safe state.

41. A computer readable medium including instructions stored thereon which when executed by one or more processors on the computer cause the computer to perform the steps of:
providing a plurality of application threads; and,
providing a native code interpreter which is configured to stop execution of an executing thread such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

42. The computer readable medium of claim 41 wherein the system includes a virtual machine and wherein said plurality of application threads execute as part of said virtual machine.

43. The computer readable medium of claim 41 wherein the system is used for the garbage collection of inactive threads in the run-time environment.

44. The computer readable medium of claim 41 wherein the system is used to perform context-switching between the threads in a run-time environment.

45. The computer readable medium of claim 41 wherein the native code interpreter is configured to interpret the machine code currently at the executing second thread, and provide interpreted machine code information to the system for use in stopping the executing second thread in a safe state.

46. A computer readable medium including instructions stored thereon which when executed by one or more processors on the computer cause the computer to perform the steps of:

providing a plurality of application threads; and, providing a native code interpreter which is used to allow a first or a stopping thread to roll a second or an executing thread forward such that the executing thread is stopped, and the native code interpreter interprets machine code to determine if the executing thread is in a safe state, and wherein if the executing thread is not in a safe state, the native code interpreter moves the executing thread forward in steps and at each step determines the state until the executing thread is finally stopped in a safe state.

47. The computer readable medium of claim 46 wherein the system includes a virtual machine and wherein said stopping and executing threads execute as part of said virtual machine.

48. The computer readable medium of claim 46 wherein the system is used for the garbage collection of inactive threads in the run-time environment.

49. The computer readable medium of claim 46 wherein the system is used to perform context-switching between the threads in a run-time environment.

50. The computer readable medium of claim 46 wherein the native code interpreter is configured to interpret the machine code currently at the executing second thread, and provide interpreted machine code information to the system for use in stopping the executing second thread in a safe state.

51. A computer readable medium including instructions stored thereon which when executed by one or more processors on the computer cause the computer to perform the steps of:

providing a first and second application threads; and, providing a native code interpreter configured to allow the first thread to stop execution of the second thread and roll the second thread forward such that the second thread is stopped, and the native code interpreter interprets machine code to determine if the second thread is in a safe state, and wherein if the second thread is not in a safe state, the native code interpreter moves the second thread forward in steps and at each step determines the state until the second thread is finally stopped in a safe state.

52. The computer readable medium of claim 51 wherein the system includes a virtual machine and wherein said first and second application threads execute as part of said virtual machine.

53. The computer readable medium of claim 51 wherein the system is used for the garbage collection of inactive threads in the run-time environment.

54. The computer readable medium of claim 51 wherein the system is used to perform context-switching between the threads in a run-time environment.

55. The computer readable medium of claim 51 wherein the native code interpreter is configured to interpret the machine code currently at the executing second thread, and provide interpreted machine code information to the system for use in stopping the executing second thread in a safe state.

56. A computer readable medium including instructions stored thereon which when executed by one or more processors on the computer cause the computer to perform the steps of:

allowing a first thread to initially halt execution of a second thread;

using native code interpretation of machine code to determine the current state of the second thread; and, allowing the first thread to roll forward the state of the second thread, wherein if the second thread is not in a safe state, the first thread uses a native code interpreter to move the second thread forward in steps and at each step to determine the state until the second thread is finally stopped in a safe state.

57. The computer readable medium of claim 56 wherein the system includes a virtual machine and wherein said plurality of first and second threads execute as part of said virtual machine.

58. The computer readable medium of claim 56 wherein the system is used for the garbage collection of inactive threads in the run-time environment.

59. The computer readable medium of claim 56 wherein the system is used to perform context-switching between the threads in a run-time environment.

60. The computer readable medium of claim 56 wherein the native code interpretation is performed by interpreting the machine code currently at the executing second thread, and providing interpreted machine code information to the system for use in stopping the executing second thread in a safe state.

* * * * *